US011269966B2

(12) United States Patent
Yang et al.

(10) Patent No.: US 11,269,966 B2
(45) Date of Patent: Mar. 8, 2022

(54) MULTI-CLASSIFIER-BASED RECOMMENDATION METHOD AND DEVICE, AND ELECTRONIC DEVICE

(71) Applicant: Advanced New Technologies Co., Ltd., Grand Cayman (KY)

(72) Inventors: Xinxing Yang, Hangzhou (CN); Jun Zhou, Hangzhou (CN); Xiaolong Li, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 38 days.

(21) Appl. No.: 16/918,869

(22) Filed: Jul. 1, 2020

(65) Prior Publication Data
US 2020/0334312 A1 Oct. 22, 2020

Related U.S. Application Data

(63) Continuation of application No. PCT/CN2019/076241, filed on Feb. 27, 2019.

(30) Foreign Application Priority Data

May 22, 2018 (CN) .......................... 201810497025.5

(51) Int. Cl.
*G06F 16/00* (2019.01)
*G06F 16/9535* (2019.01)
*G06K 9/62* (2022.01)

(52) U.S. Cl.
CPC ....... *G06F 16/9535* (2019.01); *G06K 9/6227* (2013.01); *G06K 9/6231* (2013.01)

(58) Field of Classification Search
None
See application file for complete search history.

(56) References Cited

U.S. PATENT DOCUMENTS 10,460,257 B2 * 10/2019 Sharma ................... G06F 16/35
10,607,154 B2 * 3/2020 Sullivan ............. G06Q 30/0201
(Continued)

FOREIGN PATENT DOCUMENTS

| CN | 103729351 A | 4/2014 |
| CN | 106407477 A | 2/2017 |

(Continued)

OTHER PUBLICATIONS

Aksela, "Comparison of Classifier Selection Methods for Improving Committee Performance", Helsinki University of Technology, Neural Networks Research Centre, 2003 (10 pages).

(Continued)

*Primary Examiner* — Debbie M Le
(74) *Attorney, Agent, or Firm* — Seed IP Law Group LLP (57) ABSTRACT

The present specification discloses a multi-classifier-based recommendation method and device, and an electronic device. In the method, a target sub-classifier is obtained from k sub-classifiers in a multi-classifier based on received data, where the target sub-classifier is a sub-classifier whose data distribution has a highest similarity with feature data in the multi-classifier; the first prediction data obtained after the primary classifier performs prediction on the feature data is obtained, the second prediction data obtained after the target sub-classifier performs prediction on the feature data is obtained, and then the third prediction data is obtained by combining the first prediction data and the second prediction data, so that more accurate prediction data is obtained, thereby resolving the technical problem of low accuracy of data classification prediction in the existing technology; and the feature data is recommended based on the third prediction data, so that the accuracy of data recommendation is improved.

20 Claims, 2 Drawing Sheets

(56) References Cited

U.S. PATENT DOCUMENTS

| | | | |
|---|---|---|---|
| 2016/0092893 A1* | 3/2016 | Liu | G06Q 30/0631 |
| | | | 705/7.31 |
| 2016/0275107 A1* | 9/2016 | Goodwin | G06F 16/51 |
| 2017/0031907 A1 | 2/2017 | Juang et al. | |
| 2018/0247189 A1* | 8/2018 | Adel | G06N 3/0445 |
| 2019/0164212 A1* | 5/2019 | Price | G06Q 30/02 |
| 2020/0194103 A1* | 6/2020 | Weldemariam | G16H 40/20 |

FOREIGN PATENT DOCUMENTS

| | | |
|---|---|---|
| CN | 107566856 A | 1/2018 |
| CN | 108665007 A | 10/2018 |
| TW | I372983 B | 9/2012 |
| TW | I573034 B | 3/2017 |

OTHER PUBLICATIONS

Bing, "Opinion Analysis Based on a Fusion of Multiple Classifiers Approach", 2009 International Conference on Natural Language Processing and Knowledge Engineering, IEEE, 2009.

\* cited by examiner

MULTI-CLASSIFIER-BASED RECOMMENDATION METHOD AND DEVICE, AND ELECTRONIC DEVICE

BACKGROUND

Technical Field

Embodiments of the present specification relate to the field of computer technologies, and in particular, to multi-classifier-based recommendation methods and devices, and electronic devices.

Description of the Related Art

In recent years, with the development of e-commerce, social networks, and mobile networks, network information data is increasing, and big data is defined as an emerging data concept. In addition, the explosive growth of data has led us to an era of massive data gaps. In a mass data environment, classifiers have developed rapidly in terms of data recommendation to rapidly and efficiently utilize existing information.

Most conventional classification methods assume that the data is linearly separable, and a classifier is used to classify and predict all the data. With the advent of the big data era, the requirements of data classification become higher and higher, and the single and fuzzy data classification cannot meet the current requirements. A new classification recommendation method is urgently needed to improve the accuracy of data classification prediction.

BRIEF SUMMARY

Embodiments of the present specification provide a multi-classifier-based recommendation method and device, and an electronic device, to implement diversified data classification prediction, so as to improve the accuracy of data classification prediction.

According to the first aspect, an embodiment of the present specification provides a multi-classifier-based recommendation method, including: performing prediction on received feature data based on a primary classifier in a predetermined multi-classifier to obtain first prediction data; obtaining a target sub-classifier, based on the feature data, among k sub-classifiers in the predetermined multi-classifier, a similarity between a data distribution of the target sub-classifier and the feature data being a highest, and k≥2; performing prediction on the feature data based on the target sub-classifier to obtain second prediction data; combining the first prediction data and the second prediction data based on a predetermined algorithm to obtain third prediction data; and recommending a candidate entity corresponding to the feature data based on the third prediction data.

Optionally, the obtaining a target sub-classifier, based on the feature data, among k sub-classifiers in the predetermined multi-classifier includes: if each of the k sub-classifiers has a center point of data distribution, searching for a sub-classifier whose center point is closest to a data vector of the feature data, and using the sub-classifier as the target sub-classifier.

Optionally, the obtaining a target sub-classifier, based on the feature data, among k sub-classifiers in the predetermined multi-classifier includes: if each of the k sub-classifiers has a Gaussian mixture model with data distribution parameters, searching for a sub-classifier whose data distribution parameters have a highest similarity with the feature data, and using the sub-classifier as the target sub-classifier.

Optionally, after the recommending the candidate entity corresponding to the feature data based on the third prediction data, the method further includes: detecting whether a user selects the recommended entity corresponding to the feature data; and updating parameters of the target sub-classifier and the primary classifier that correspond to the feature data based on whether the user selects the recommended entity.

Optionally, the updating the parameters of the target sub-classifier and the primary classifier that correspond to the feature data based on whether the user selects the recommended entity includes: if the user selects the recommended entity, providing positive feedback to the multi-classifier, or if the user does not select the recommended entity, providing negative feedback to the multi-classifier; and updating the parameters of the target sub-classifier and the primary classifier that correspond to the feature data based on the positive feedback or the negative feedback.

Optionally, after the performing prediction on the feature data based on the target sub-classifier to obtain second prediction data, the method further includes: updating the center point of the target sub-classifier based on the data vector of the feature data.

Optionally, the updating the center point of the target sub-classifier based on the data vector of the feature data includes:

$$P_{t+1} = P_t + \frac{x_t - P_t}{n_i}, n_{i+1} = n_i + 1$$

where $P_{t+1}$ indicates the center point of the target sub-classifier after the updating; $P_t$ indicates the center point of the target sub-classifier before the updating; $x_t$ indicates the data vector; $n_t$ indicates an amount of data allocated to the target sub-classifier before the updating; and $n_{i+1}$ indicates an amount of data of the target sub-classifier after the updating.

According to the second aspect, an embodiment of the present specification provides a multi-classifier-based recommendation device, including: a first classification unit, configured to perform prediction on received feature data based on a primary classifier in a predetermined multi-classifier to obtain first prediction data; a search unit, configured to obtain a target sub-classifier, based on the feature data, among k sub-classifiers in the predetermined multi-classifier, a similarity between a data distribution of the target sub-classifier and the feature data being a highest, and k≥2; a second classification unit, configured to perform prediction on the feature data based on the target sub-classifier to obtain second prediction data; a combining unit, configured to combine the first prediction data and the second prediction data based on a predetermined algorithm to obtain third prediction data; and a recommending unit, configured to recommend a candidate entity corresponding to the feature data based on the third prediction data.

Optionally, the search unit is configured to: if each of the k sub-classifiers has a center point of data distribution, search for a sub-classifier whose center point is closest to a data vector of the feature data, and use the sub-classifier as the target sub-classifier.

Optionally, the search unit is configured to: if each of the k sub-classifiers has a Gaussian mixture model with data distribution parameters, search for a sub-classifier whose data distribution parameters have a highest similarity with the feature data, and use the sub-classifier as the target sub-classifier.

Optionally, the device further includes: an updating unit, configured to: after a candidate entity corresponding is recommended, detect whether a user selects the recommended entity corresponding to the feature data; and update parameters of the target sub-classifier and the primary classifier that correspond to the feature data based on whether the user selects the recommended entity.

Optionally, the updating unit is configured to: if the user selects the recommended entity and performs positive feedback on the multi-classifier, or if the user does not select the recommended entity and performs negative feedback on the multi-classifier, updating the parameters of the target sub-classifier and the primary classifier that correspond to the feature data based on the positive feedback or the negative feedback.

Optionally, the device further includes: an updating unit, configured to: after the feature data is predicted based on the target sub-classifier to obtain second prediction data, update the center point of the target sub-classifier based on the data vector of the feature data.

Optionally, the updating unit is further configured to update the center point of the target sub-classifier based on the following equation:

$$P_{t+1} = P_t + \frac{x_t - P_t}{n_i}, n_{i+1} = n_i + 1$$

where $P_{t+1}$ indicates the center point of the target sub-classifier after the updating; $P_t$ indicates the center point of the target sub-classifier before the updating; $x_t$ indicates the data vector; $n_i$ indicates an amount of data allocated to the target sub-classifier before the updating; and $n_{i+1}$ indicates an amount of data of the target sub-classifier after the updating.

According to a third aspect, an embodiment of the present specification provides a computer readable storage medium, where the medium stores a computer program, and when the computer program is executed by a processor, the following steps are implemented: performing prediction on received feature data based on a primary classifier in a predetermined multi-classifier to obtain first prediction data; obtaining a target sub-classifier, based on the feature data, among k sub-classifiers in the predetermined multi-classifier, a similarity between a data distribution of the target sub-classifier and the feature data being a highest, and k≥2; performing prediction on the feature data based on the target sub-classifier to obtain second prediction data; combining the first prediction data and the second prediction data based on a predetermined algorithm to obtain third prediction data; and recommending a candidate entity corresponding to the feature data based on the third prediction data.

According to a fourth aspect, an embodiment of the present specification provides an electronic device, where the electronic device includes a memory and one or more programs, and the one or more programs are stored in the memory and can be executed by one or more processors to perform the following steps: performing prediction on received feature data based on a primary classifier in a predetermined multi-classifier to obtain first prediction data; obtaining a target sub-classifier, based on the feature data, among k sub-classifiers in the predetermined multi-classifier, a similarity between a data distribution of the target sub-classifier and the feature data being a highest, and k≥2; performing prediction on the feature data based on the target sub-classifier to obtain second prediction data; combining the first prediction data and the second prediction data based on a predetermined algorithm to obtain third prediction data; and recommending a candidate entity corresponding to the feature data based on the third prediction data.

One or more of the above technical solutions in the embodiments of the present specification have at least the following technical effects:

According to the multi-classifier-based recommendation method provided in the embodiment of the present specification, feature data is classified by using a primary classifier and a target sub-classifier in the multi-classifier, so that diversified data classification prediction is implemented, and the accuracy of data classification prediction is improved. In addition, a sub-classifier whose data distribution has a highest similarity with the feature data is selected from the multi-classifier as the target sub-classifier, the first prediction data obtained after the primary classifier performs prediction on the feature data is obtained, the second prediction data obtained after the target sub-classifier performs prediction on the feature data is obtained, and then the third prediction data is obtained by combining the first prediction data and the second prediction data, so that more accurate prediction data is obtained, thereby resolving the technical problem of low accuracy of data classification prediction in the existing technology. Further, the feature data is recommended based on the third prediction data, so that the accuracy of data recommendation is improved.

BRIEF DESCRIPTION OF THE DRAWINGS

To describe the technical solutions in the embodiments of the present specification more clearly, the following outlines the accompanying drawings for illustrating such technical solutions. Clearly, the accompanying drawings outlined below are some embodiments of the present specification, and a person skilled in the art can derive other drawings from such accompanying drawings without creative efforts.

DETAILED DESCRIPTION

To make the objectives, technical solutions, and advantages of the embodiments of the present specification clearer, the following description clearly and comprehensively describes the technical solutions in the embodiments of the present specification with reference to the accompanying drawings in the embodiments of the present specification. Clearly, the described embodiments are some rather than all of the embodiments of the present specification. Based on the embodiments of the present specification, a person skilled in the art can obtain other embodiments without creative efforts, which all fall within the scope of the present specification.

Embodiments of the present specification provide a multi-classifier-based recommendation method and device, and an electronic device, to implement diversified data classification prediction, so as to improve the accuracy of data classification prediction.

The main implementation principles, specific implementations, and corresponding beneficial effects of the technical solutions in the embodiments of the present specification are described below in detail with reference to the accompanying drawings.

Figure 1:
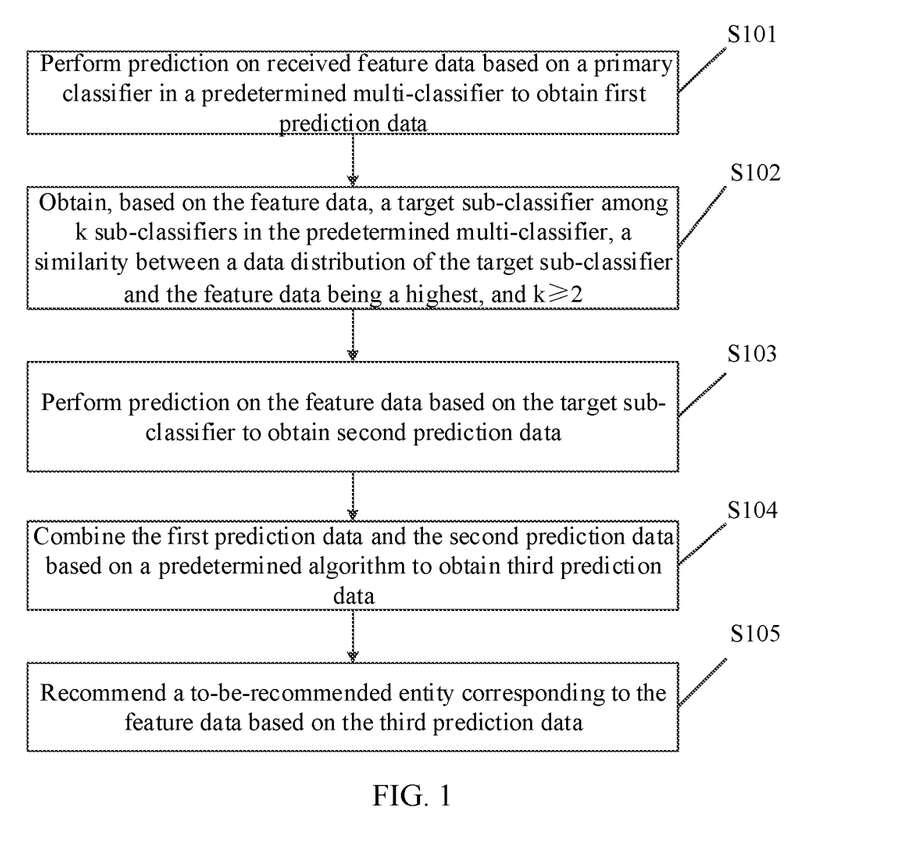
FIG. 1 is a schematic flowchart illustrating a multi-classifier-based recommendation method, according to an embodiment of the present specification.

The present specification provides a multi-classifier, e.g., predetermined or dynamically determined, including a primary classifier and k sub-classifiers, where In the description herein, predetermined multi-classifiers are used as illustrative examples, which do not limit the scope of the specification. For example, the primary classifier, each of the k sub-classifiers, and the number k of sub-classifiers may be dynamically configured or updated based on the data stream received. For example, the multi-classifier may be updated based on the features of users, the features of candidate entities, and user responses to candidate entities recommended to users. The primary classifier is predetermined to be used to classify the feature. One of more of the sub-classifiers are selected based on the feature data to be used to classify the feature data and are thus not predetermined to be used in classifying the feature data. Based on the multi-classifier, an embodiment of the present specification further provides a multi-classifier-based recommendation method. As shown in FIG. 1, the method includes:

S101: Perform prediction on received feature data based on a primary classifier in a predetermined multi-classifier to obtain first prediction data.

S102: Obtain, based on the feature data, a target sub-classifier among k sub-classifiers in the predetermined multi-classifier, a similarity between a data distribution of the target sub-classifier and the feature data being a highest, and S103: Perform prediction on the feature data based on the target sub-classifier to obtain second prediction data.

S104: Combine the first prediction data and the second prediction data based on a predetermined algorithm to obtain third prediction data.

S105: Recommend a candidate entity corresponding to the feature data based on the third prediction data.

In a specific implementation process, the predetermined multi-classifier can perform classification prediction on the features of the candidate entity, and predict the classification of the candidate entity. A candidate entity is an entity in a list of entities that are to be recommended to a user, and is also referred to as a to-be-recommended entity. An entity may be a product, a service, a legal entity, an individual person, or any entity that is available to be recommended to a user. In some embodiments, candidate entities are dynamically classified with respect to the users. For example, a user may be classified as a candidate entity with respect to another user. Whether a candidate entity/a to-be-recommended entity is actually recommended to a user is determined in substantially real time by calculating a classification prediction indicating whether the candidate entity is classified as one that matches or fits the user. For example, classification predictions of a plurality of candidate entities are calculated for a same user and the candidate entities are ranked based on the classification prediction scores thereof for the purposes of recommending one or more of the candidate entities to the user. For example, the predetermined multi-classifier can also perform classification prediction on a feature data that is formed by features, e.g., characteristics, properties, parameters, of a user and the features, e.g., characteristics, properties, parameters, of the candidate entity, predict a score of the candidate entity with respect to the user and determine, based on the score, whether to recommend the entity to the user. For this purpose, the feature data received by the multi-classifier can be the feature data of the candidate entity, or can be the feature data formed by combining the features of the candidate entity and the features of the user. In some implementations, one or more of the features of users and the features of candidate entities are of non-linear data structure. As such, the feature data that is fed into the multi-classifier is a non-linear data.

The predetermined multi-classifier performs S101 and S102 after receiving the feature data. The execution order of S101 and S102 is not limited; that is, S101 and S102 can be performed at the same time, or either S101 or S102 can be performed first.

In S101, the received feature data is predicted based on the primary classifier to obtain the first prediction data. Specifically, the feature data can be input to the primary classifier, and the primary classifier scores the feature data to obtain the first score, e.g., the first prediction data. In some embodiments, the feature data is detected by a data sensing suite that includes sensors and/or other data sensing devices that are embedded in a computing device that implements the multi-classifier or are coupled to the computing device through electrical or communicational coupling links. For example, the data sensing suite may include radar sensors, motion sensors, temperature sensors, pressure sensors, range sensors, RFID sensors, audio sensors, video sensors, software data sensors, web crawlers, or other sensors or sensing devices. In some embodiments, some of the sensors or sensing devices of the data sensing suite are arranged in an internet of thing ("IOT") environment that obtain data streams on incidents or things in the computing device or outside the computing device through the internet or other networks. In some embodiment, the detecting or monitoring of the feature data is conducted wholly through internet or other networks of computing on activities of users in the internet or other networks of computing.

In S102, the target sub-classifier is determined based on the received feature data, and the sub-classifier whose data distribution has a highest similarity with the feature data is selected from the k sub-classifiers in the multi-classifier as the target sub-classifier. The data distribution of the sub-classifier refers to the distribution of the data received and classified by the sub-classifier, or the distribution of the sample data used to form the sub-classifier through training. A higher similarity between the received feature data with the data distribution of the sub-classifier means that the sub-classifier classifies the feature data with higher accuracy.

Here, in S102, the target sub-classifier can be determined using any one or more of the following methods:

Method 1: If each of the k sub-classifiers in the multi-classifier has a center point of data distribution, the sub-classifier whose center point is closest to a data vector of the feature data is selected as the target sub-classifier. In some embodiments, a feature data may include multiple data vectors and thus multiple target sub-classifiers may be selected based on the multiple data vectors. For example, a candidate video content may include multiple data vectors of romance, drama, European, Renaissance. Each of those data vectors may find a separate target sub-classifier in a multi-classifier. In some embodiments, each sub-classifier has a center point of data distribution. If the data vector of the feature data is closest to a center point of a sub-classifier, it indicates that the feature data has a highest similarity with the data distribution of the sub-classifier, and the sub-classifier is selected as the target sub-classifier.

In a specific implementation process, in this embodiment of the present specification, a center point of data distribution can be established and updated for any sub-classifier. First, the k sub-classifiers are initialized, and their center points of data distribution are initialized to be empty. Then, the to-be-classified feature data is received by using the multi-classifier, and when the data amount of the feature data received by the multi-classifier is less than a predetermined threshold, a sub-classifier is randomly selected as the target sub-classifier; and after the target sub-classifier performs classification prediction on the feature data, a center point of the target sub-classifier is updated based on a data vector of the feature data.

If the center point of the target sub-classifier is empty, the data vector of the feature data is used as the center point of the target sub-classifier.

If the center point of the target sub-classifier is not empty, the center point of the target sub-classifier is updated based on the following equation 1:

$$P_{t+1} = P_t + \frac{x_t - P_t}{n_i}, n_{i+1} = n_i + 1,\qquad \text{Equation 1}$$

where $P_{t+1}$ indicates the center point of the target sub-classifier after the updating; $P_t$ indicates the center point of the target sub-classifier before the updating; $x_t$ indicates the data vector of the feature data; $n_i$ indicates an amount of data allocated to the target sub-classifier before the updating; and $n_{i+1}$ indicates an amount of data of the target sub-classifier after the updating.

When the data amount of the feature data received by the multi-classifier is greater than or equal to a predetermined or dynamically determined threshold, the distance between the data vector of the feature data and the center point of each sub-classifier is calculated. This embodiment of the present specification does not limit a specific algorithm used for calculating the distance between the data vector and the center point, and the Euclidean distance, the Manhattan distance, the Chebyshev distance, etc., can be used. A sub-classifier whose center point is closest to the data vector is selected as a target sub-classifier; and after the target sub-classifier performs classification prediction on the data vector of the feature data, the target sub-classifier is updated by using Equation 1.

Method 2: If each of the k sub-classifiers in the multi-classifier is a Gaussian mixture model with data distribution parameters, the sub-classifier whose data distribution parameters have a highest similarity with feature data is selected from the k sub-classifiers as the target sub-classifier. The similarity between the data distribution parameters and the feature data can be calculated by using a cosine similarity, a Pearson correlation coefficient, a Euclidean distance, etc.

After the target sub-classifier is obtained in S102, S103 is performed, and the second prediction data is obtained by performing prediction on the feature data based on the obtained target sub-classifier. Specifically, the feature data is input to the target sub-classifier, and the target sub-classifier scores the feature data to obtain the second score, e.g., the second prediction data.

Further, after the first prediction data and the second prediction data have been obtained, S104 is performed, and the first prediction data and the second prediction data are combined based on a predetermined algorithm to obtain the third prediction data. Specifically, the predetermined algorithm can add the first prediction data and the second prediction data to obtain the third prediction data; or can multiply the first prediction data by a first weight to obtain a first product, multiply the second prediction data by a second weight to obtain a second product, and obtain the sum of the first product and the second product as the third prediction data.

After S104, S105 is performed, and the candidate entity corresponding to the feature data is recommended based on the third prediction data. Specifically, the third prediction data is sorted, and a candidate entity that corresponds to a feature data having a higher-ranked third prediction data is recommended to the user. Alternatively, it is determined whether the third prediction data is within a predetermined range, and if the third prediction data is within the predetermined range, a candidate entity corresponding to the feature data to which the third prediction data belongs is recommended to the user.

In a specific implementation process, in this embodiment, feedback is also provided to the multi-classifier based on whether the recommended entity is selected by the user, so as to update related parameters of the multi-classifier, e.g., through machine learning or training. It is determined whether the user selects the recommended entity corresponding to the feature data; and parameters of the target sub-classifier and the primary classifier that correspond to the feature data are updated based on whether the user selects the recommended entity corresponding to the feature data. If the user selects the recommended entity, "1" is fed back to the multi-classifier, representing positive feedback, or if the user does not select the recommended entity, "−1" is fed back to the multi-classifier representing negative feedback; and parameters of the target sub-classifier and the primary classifier that correspond to the feature data are updated based on the positive feedback or the negative feedback.

The following describes in detail a specific method for updating parameters of the target sub-classifier and the primary classifier, but the embodiment of the present specification is not limited to this updating method.

In this embodiment of the present specification, a weight vector and a relational matrix are configured for each classifier (the primary classifier and each sub-classifier). The weight vector is 0 at the time of initialization, and the relational matrix is an identity matrix at the time of initialization. Assuming that the dimension of the input sample feature is d, then the dimension of the weight vector of each classifier is d*1, and the dimension of the relational matrix is d*d. Therefore, the weight vector of the multi-classifier and the relational matrix as a whole can be expressed as follows:

$$\tilde{\mu} = \left[\sqrt{\lambda}\,\mu^T, \mu_1^T, \ldots, \mu_j^T, \ldots, \mu_K^T\right]^T,\qquad \text{Equation 2}$$

$$\tilde{\Sigma} = \begin{bmatrix} \sqrt{\lambda}\,\Sigma & 0 & \cdots & 0 \\ 0 & \Sigma_1 & \cdots & 0 \\ \vdots & 0 & \ddots & 0 \\ 0 & \cdots & \cdots & \Sigma_k \end{bmatrix},\qquad \text{Equation 3}$$

where $\tilde{\mu}$ indicates the weight vector of the multi-classifier; $\tilde{\Sigma}$ indicates the relational matrix of the multi-classifier; $\mu$ indicates the weight vector of the primary classifier; $\mu_1$ to $\mu_K$ indicate the weight vectors of the first to the $k^{th}$ sub-classifiers; $\mu_j$ indicates the weight vector of the $j^{th}$ sub-classifier; $\lambda$ indicates the weight of the primary classifier, which is usually 1; $\Sigma$ indicates the relational matrix of the primary classifier; and $\Sigma_1$ to $\Sigma_k$ indicate the relational matrices of the first to the $k^{th}$ sub-classifiers. To distinguish between the parameters before and after the update, the weight vector of the multi-classifier at time t can be expressed as $\tilde{\mu}_t$, and the updated weight vector can be expressed as $\tilde{\mu}_{t+1}$; similarly, the relational matrix of the multi-classifier at time t can be expressed as $\tilde{\Sigma}_t$, and the updated relational matrix can be expressed as $\tilde{\Sigma}_{t+1}$.

Assuming that the data vector of the feature data corresponding to the recommended entity is the $i^{th}$ data vector $x_t$ assigned to the $j^{th}$ sub-classifier, e.g., the target sub-classifier, a new data form can be constructed relative to the entire multi-classifier:

$$\tilde{x}_t = [x_t^T, 0_1^T, \ldots, 0_{j-1}^T, x_t^T, 0_{j+1}^T, \ldots, 0_K^T]^T \qquad \text{Equation 4,}$$

After the above data form is constructed, the $i^{th}$ data vector $x_t$ corresponds to the primary classifier and the $j^{th}$ sub-classifier. Positive feedback or negative feedback is provided to the multi-classifier based on whether the user selects the recommended entity. For example, the user can select the recommended entity through clicking, pressing and holding, or pressing heavily. If the user selects the recommended entity, positive feedback is provided, e.g., $y_t=+1$ is fed back to the multi-classifier; or if the user does not select the recommended entity, negative feedback is provided, e.g., $y_t=-1$ is fed back to the multi-classifier.

The weight vectors and relational matrices of the primary classifier and the $j^{th}$ sub-classifier are updated based on the positive feedback or the negative feedback. Specifically, the predicted loss value of the $i^{th}$ data vector can be first calculated based on the identifier $y_t$ that is fed back and the $i^{th}$ data vector. If the loss value is greater than 0, the loss value is updated; otherwise the loss value is not updated. In this way, the accuracy of the update is improved.

During calculation of the loss value, the loss value of the $i^{th}$ data vector that is predicted by the multi-classifier can be calculated by using the following equation based on $y_t$, the $i^{th}$ data vector, and the weight vectors and relational matrices of the primary classifier and the $j^{th}$ sub-classifier:

$$\ell = \max(0, \tilde{\phi}\sqrt{\tilde{x}_t^T \tilde{\Sigma} \tilde{x}_t} - y_t \tilde{\mu}^T \tilde{x}_t) \qquad \text{Equation 5,}$$

where $\ell$ indicates the loss value; $\tilde{\phi}$ indicates a hyperparameter; $\tilde{x}_t$ is constructed based on the $i^{th}$ data vector $x_t$ (see Equation 4); $\tilde{\mu}$ and $\tilde{\Sigma}$ respectively indicate the weight vector and relational matrix of the multi-classifier (see Equations 1 and 2). $\tilde{\phi}$ can usually be an inverse function of a normal distribution accumulation function, for example, $\tilde{\phi}=\Phi^{-1}(\eta)$.

It is determined whether the loss value $\ell$ is greater than 0. If the loss value $\ell$ is greater than 0, the weight vectors and relational matrices of the primary classifier and the $i^{th}$ sub-classifier are updated based on $y_t$ and the $i^{th}$ data vector. On the contrary, if the loss value $\ell$ is not greater than 0, the weight vectors and the relationship matrices are not updated. When the weight vectors and the relational matrices are updated, other parameters of the multi-classifier can also be updated based on the $i^{th}$ data vector, where $\tilde{\alpha}_t$ and $\tilde{\beta}_t$ can be predetermined, dynamically determined or experimentally determined parameters and can be updated based on the following parameters. The specific updating equations are as follows:

$$\tilde{\mu}_{t+1} = \tilde{\mu}_t + \tilde{\alpha}_t y_t \tilde{\Sigma}_t \tilde{x}_t, \qquad \text{Equation 6}$$

$$\tilde{\Sigma}_{t+1} = \tilde{\Sigma}_t - \tilde{\beta}_t \tilde{\Sigma}_t \tilde{x}_t \tilde{x}_t^T \tilde{\Sigma}_t \qquad \text{Equation 7}$$

$$\tilde{\alpha}_t = \max\left\{C, \max\left\{0, \frac{1}{\tilde{v}_t \tilde{\zeta}}\left(-\tilde{m}_t \tilde{\psi} + \sqrt{\tilde{m}_t^2 \frac{\tilde{\phi}^4}{4} + \tilde{v}_t \tilde{\phi}^2 \tilde{\zeta}}\right)\right\}\right\}, \qquad \text{Equation 8}$$

$$\tilde{\beta}_t = \frac{\tilde{\alpha}_t \tilde{\phi}}{\sqrt{\tilde{u}_t} + \tilde{v}_t \tilde{\alpha}_t \tilde{\phi}}, \qquad \text{Equation 9}$$

$$\tilde{u}_t = \frac{1}{4}\left(-\tilde{\alpha}_t \tilde{v}_t \tilde{\phi} + \sqrt{\tilde{\alpha}_t^2 \tilde{v}_t^2 \tilde{\phi}_t^2 + 4\tilde{v}_t}\right)^2, \tilde{v}_t = \tilde{x}_t^T \tilde{\Sigma}_t \tilde{x}_t, \qquad \text{Equation 10}$$

$$\tilde{\psi} = 1 + \frac{\tilde{\phi}^2}{2} \text{ and } \tilde{\zeta} = 1 + \tilde{\phi}^2, \qquad \text{Equation 11}$$

$$\tilde{m}_t = y_t \tilde{\mu}_t^T \tilde{x}_t, \qquad \text{Equation 12}$$

where $\tilde{\mu}_{t+1}$ indicates the updated weight vector of the multi-classifier, and $\tilde{\Sigma}_{t+1}$ indicates the updated relational matrix of the multi-classifier. Based on Equations 1 and 2, the updated weight vectors $\mu$ and $\mu_j$ of the primary classifier and the $j^{th}$ sub-classifier are obtained from $\tilde{\mu}_{t+1}$; and the relational matrices $\Sigma$ and $\Sigma_j$ of the primary classifier and the $j^{th}$ sub-classifier are obtained from $\tilde{\Sigma}_{t+1}$. C is a hyperparameter and can be usually set to 1.

In the previously described embodiment, feature data is classified by using a primary classifier and a target sub-classifier in the multi-classifier, so that diversified data classification prediction is implemented, and the accuracy of data classification prediction is improved. In addition, a sub-classifier whose data distribution has a highest similarity with the feature data is selected from the multi-classifier as the target sub-classifier, the first prediction data obtained after the primary classifier performs prediction on the feature data is obtained, the second prediction data obtained after the target sub-classifier performs prediction on the feature data is obtained, and then the third prediction data is obtained by combining the first prediction data and the second prediction data, so that more accurate prediction data is obtained, thereby resolving the technical problem of low accuracy of data classification prediction in the existing technology. Further, the feature data is recommended based on the third prediction data, so that the accuracy of data recommendation is improved.

Further, in the previously described embodiment, feedback is provided to the multi-classifier based on whether the user selects the recommended entity, so as to implement online updating and real-time learning of the multi-classifier, so that the preferences and interests of the user can be predicted in real time based on the real-time data stream, all the received data are used only once, and no historical information needs to be stored, thereby reducing the online storage pressure and the calculation complexity. In addition, by updating the center point and the classifier parameters, the multi-classifier model can be trained online in real time, thereby reducing the operation and maintenance pressure of the model (going online and going offline).

Figure 2:
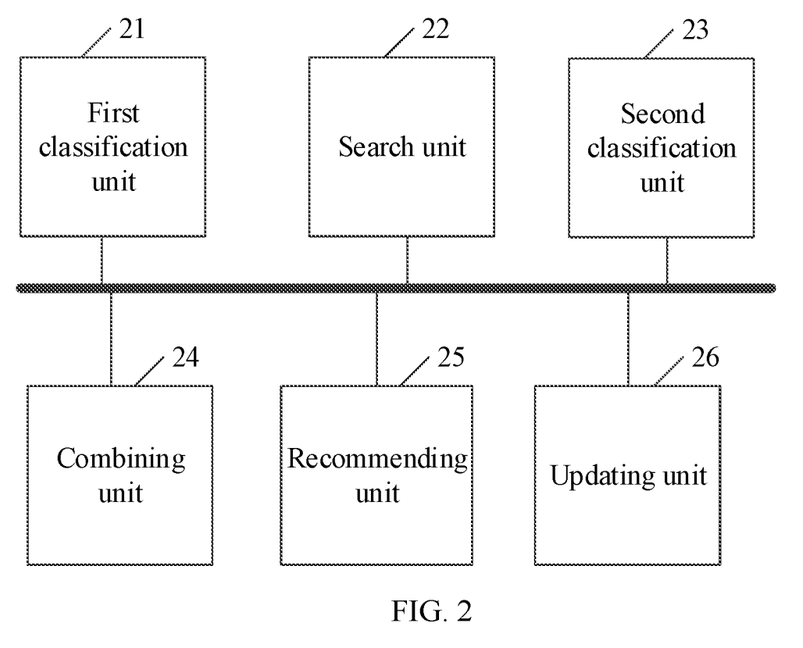
FIG. 2 is a schematic flowchart illustrating a multi-classifier-based recommendation device, according to an embodiment of the present specification.

Based on the multi-classifier-based recommendation method provided in the above embodiments, this embodiment also correspondingly provides a multi-classifier-based recommendation device. Referring to FIG. 2, the device includes: a first classification unit 21, configured to perform prediction on received feature data based on a primary classifier in a predetermined multi-classifier to obtain first prediction data; a search unit 22, configured to obtain a target sub-classifier, based on the feature data, among k sub-classifiers in the predetermined multi-classifier, a similarity between a data distribution of the target sub-classifier and the feature data being a highest, and k≥2; a second classification unit 23, configured to perform prediction on the feature data based on the target sub-classifier to obtain second prediction data; a combining unit 24, configured to combine the first prediction data and the second prediction data based on a predetermined algorithm to obtain third prediction data; and a recommending unit 25, configured to recommend a candidate entity corresponding to the feature data based on the third prediction data.

In an optional embodiment, the search unit 22 is configured to: if each of the k sub-classifiers has a center point of data distribution, search for a sub-classifier whose center point is closest to a data vector of the feature data, and using the sub-classifier as the target sub-classifier; or if each of the k sub-classifiers has a Gaussian mixture model with data distribution parameters, search for a sub-classifier whose data distribution parameters have a highest similarity with the feature data, and use the sub-classifier as the target sub-classifier.

In an optional embodiment, the device further includes an updating unit 26. The updating unit 26 can be configured to: after a candidate entity corresponding is recommended, detect whether a user selects the recommended entity corresponding to the feature data; and update parameters of the target sub-classifier and the primary classifier that correspond to the feature data based on whether the user selects the recommended entity. Specifically, the updating unit 26 is configured to: if the user selects the recommended entity, provide positive feedback to the multi-classifier, or if the user does not select the recommended entity, provide negative feedback to the multi-classifier; and update the parameters of the target sub-classifier and the primary classifier that correspond to the feature data based on the positive feedback or the negative feedback.

The updating unit 26 can be further configured to: after the feature data is predicted based on the target sub-classifier to obtain second prediction data, update the center point of the target sub-classifier based on the data vector of the feature data. Specifically, the updating unit can update the center point of the target sub-classifier based on the following equation:

$$P_{t+1} = P_t + \frac{x_t - P_t}{n_i}, n_{i+1} = n_i + 1$$

where $P_{t+1}$ indicates the center point of the target sub-classifier after the updating; $P_t$ indicates the center point of the target sub-classifier before the updating; $x_t$ indicates the data vector; $n_i$ indicates an amount of data allocated to the target sub-classifier before the updating; and $n_{i+1}$ indicates an amount of data of the target sub-classifier after the updating.

The specific operation methods of the units of the device have been described in detail in the above in related method embodiments. Details are omitted here for simplicity.

Figure 3:
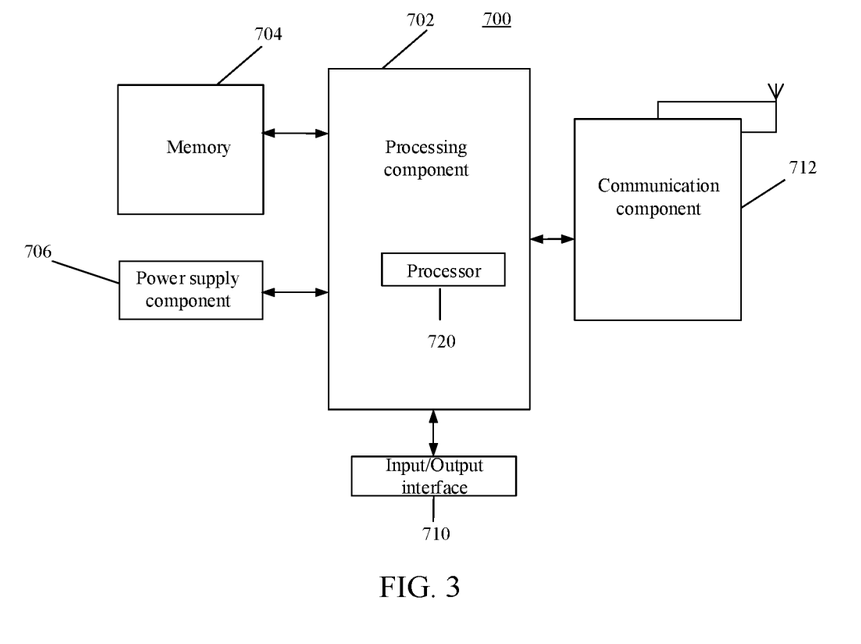
FIG. 3 is a schematic diagram illustrating an electronic device, according to an embodiment of the present specification.

FIG. 3 is a block diagram illustrating an electronic device 700 configured to implement a data query method, according to an example embodiment of the present specification. For example, the electronic device 700 can be a computer, a database console, a tablet device, a personal digital assistant, etc.

Referring to FIG. 3, the electronic device 700 can include one or more of the following components: a processing component 702, a memory 704, a power supply component 706, a multimedia component 708, an input/output (I/O) interface 710, and a communication component 712.

The processing component 702 generally controls the overall operation of the electronic device 700, such as operations associated with display, data communication, and recording operations. The processing component 702 can include one or more processors 720 for executing instructions to perform all or some of the steps of the method described above. In addition, the processing component 702 can include one or more modules to facilitate interaction between the processing component 702 and other components.

The memory 704 is configured to store various types of data to support operations at the electronic device 700. Examples of such data include instructions for any application or method that are performed on the electronic device 700, contact data, phone book data, messages, pictures, video, etc. The memory 704 can be implemented by any type of volatile or non-volatile storage device or a combination thereof, for example, a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power supply component 706 supplies power to various components of the electronic device 700. The power supply component 706 can include a power management system, one or more power supplies, and other components associated with generation, management, and distribution of electric power by the electronic device 700.

The I/O interface 710 provides an interface between the processing component 702 and a peripheral interface module, where the peripheral interface module can be a keyboard, a click wheel, a button, etc. These buttons can include, but are not limited to, a home page button, a volume button, a start button, and a lock button.

The communication component 712 is configured to facilitate wired or wireless communication between the electronic device 700 and other devices. The electronic device 700 can access a wireless network based on a communication standard, such as Wi-Fi, 2G or 3G, or a combination thereof. In an example embodiment, the communication component 712 receives broadcast signals or broadcast-related information from an external broadcast management system through a broadcast channel. In an example embodiment, the communication component 712 further includes a near field communication (NFC) module to facilitate short-range communication. For example, the NFC module can be implemented based on the Radio Frequency Identification (RFID) technology, the Infrared Data Association (IrDA) technology, the ultra wideband (UWB) technology, the Bluetooth (BT) technology, and other technologies.

In an example embodiment, the electronic device 700 can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the methods described above.

In an example embodiment, a non-temporary computer-readable storage medium including instructions is provided.

For example, the storage medium is the memory 704 including instructions that can be executed by the processor 720 of the electronic device 700 to perform the methods described above. For example, the non-transitory computer-readable storage medium can be a ROM, a random access memory (RAM), a CD-ROM, a magnetic tape, a floppy disk, an optical data storage device, etc.

When the instructions in the non-transitory computer-readable storage medium are executed by a processor of a mobile terminal, the electronic device is enabled to perform a multi-classifier-based recommendation method, including: performing prediction on received feature data based on a primary classifier in a predetermined multi-classifier to obtain first prediction data; obtaining a target sub-classifier, based on the feature data, among k sub-classifiers in the predetermined multi-classifier, a similarity between a data distribution of the target sub-classifier and the feature data being a highest, and k≥2; performing prediction on the feature data based on the target sub-classifier to obtain second prediction data; combining the first prediction data and the second prediction data based on a predetermined algorithm to obtain third prediction data; and recommending a candidate entity corresponding to the feature data based on the third prediction data.

It should be understood that the present specification is not limited to the precise structures already described above and illustrated in the accompanying drawings, and various modifications and changes can be made without departing from the scope thereof. The protection scope of the present specification should be defined by the appended claims.

The above descriptions are merely preferred embodiments of the present specification, and are not intended to limit the present specification. Any modification, equivalent replacement, improvement, etc., made without departing from the spirit and principles of the present specification shall fall within the protection scope of the present specification.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
   identifying, a multi-classifier, the multi-classifier including a first classifier and a plurality of second classifiers;
   performing classification prediction on a feature data related to an entity based on the first classifier of the multi-classifier to obtain a first prediction data, the feature data including one or more of a characteristic, a property, or a parameter of the entity;
   selecting a target second classifier from the plurality of second classifiers of the multi-classifier by comparing the feature data with a data distribution of each of the plurality of second classifiers, a similarity between a data distribution of the target second classifier and the feature data being highest among the plurality of second classifiers, a data distribution of a second classifier of the plurality of second classifiers being one or more of a distribution of data received and classified by the second classifier or a distribution of sample data used to train the second classifier, and having one or more of a center point or a Gaussian mixture model parameter;
   performing classification prediction on the feature data based on the target second classifier to obtain a second prediction data;
   combining the first prediction data and the second prediction data to obtain a third prediction data; and
   classifying the entity based on the third prediction data.

2. The method according to claim 1, wherein the identifying the target second classifier comprises:
   determining that each of the plurality of second classifiers has a center point of data distribution; and
   selecting a second classifier whose center point is closest to a data vector of the feature data among the plurality of second classifiers as the target second classifier.

3. The method according to claim 1, wherein the obtaining the target second classifier comprises:
   determining that each of the plurality of second classifiers has a Gaussian mixture model parameter in data distribution; and
   selecting a second classifier whose Gaussian mixture model parameter has a highest similarity with that of the feature data among the plurality of second classifiers as the target second classifier.

4. The method according to claim 1, further comprising recommending the entity to a user based on a result of the classifying the entity.

5. The method of claim 4, further comprising:
   after the recommending the entity to the user, detecting a response of the user to the recommending the entity; and
   updating a parameter of one or more of the target second classifier or the first classifier based on the response of the user.

6. The method according to claim 5, wherein the updating the parameter of the one or more of the target second classifier or the first classifier comprises:
   providing one of positive feedback or negative feedback to the multi-classifier based on the response of the user; and
   updating the parameter of the one or more of the target second classifier or the first classifier based on the one of the positive feedback or the negative feedback.

7. The method according to claim 2, further comprising:
   after the performing the classification prediction on the feature data based on the target second classifier, updating the center point of the target second classifier based on the data vector of the feature data.

8. The method according to claim 7, wherein the updating the center point of the target second classifier based on the data vector of the feature data uses an algorithm:

$$P_{t+1} = P_t + \frac{x_t - P_t}{n_i}, n_{i+1} = n_i + 1,$$

wherein $P_{t+1}$ indicates the center point of the target second classifier after the updating; $P_t$ indicates the center point of the target second classifier before the updating; $x_t$ indicates the data vector; $n_i$ indicates an amount of data allocated to the target second classifier before the updating; and $n_{i+1}$ indicates an amount of data of the target second classifier after the updating.

9. The method of claim 1, further comprising forming the feature data by combining a feature of the entity and a feature of a user.

10. A device, comprising:
a first classification unit, configured to perform classification prediction on a feature data based on a primary classifier of a multi-classifier to obtain a first prediction data, the feature data related to an entity and including one or more of a characteristics, a property, or a parameter of the entity;
a search unit, configured to select a target sub-classifier from a plurality of sub-classifiers of the multi-classifier by comparing the feature data with a data distribution of each of the plurality of slab-classifiers, a similarity between a data distribution of the target sub-classifier and the feature data being highest among the plurality of sub-classifiers, a data distribution of a sub-classifier of the plurality of sub-classifiers being one or more of a distribution of data received and classified by the sub-classifier or a distribution of sample data used to train the sub-classifier, and having one or more of a center point or a Gaussian mixture model parameter;
a second classification unit, configured to perform classification prediction on the feature data based on the target sub-classifier to obtain a second prediction data;
a combining unit, configured to combine the first prediction data and the second prediction data based on an algorithm to obtain a third prediction data; and
a recommending unit, configured to recommend the entity to a user based on the third prediction data.

11. The device according to claim 10, wherein the search unit is configured to:
determine that each of the plurality of sub-classifiers has a center point of data distribution; and
select a sub-classifier whose center point is closest to a data vector of the feature data among the plurality of sub-classifiers as the target sub-classifier.

12. The device according to claim 10, wherein the search unit is configured to:
determine that each of the plurality of sub-classifiers has a Gaussian mixture model parameter in data distribution; and
select a sub-classifier whose Gaussian mixture model parameter has a highest similarity with that of the feature data among the plurality of sub-classifiers as the target sub-classifier.

13. The device according to claim 10, further comprising an updating unit configured to:
after the entity is recommended to the user, detect whether the user selects the entity recommended to the user; and
update a parameter of one or more of the target sub-classifier or the primary classifier based on whether the user selects the entity recommended to the user.

14. The device according to claim 13, wherein the updating unit is configured to:
in response to that the user selects the entity recommended to the user, update the parameter of one or more of the target sub-classifier and the primary classifier based on positive feedback; and
in response to the user does not select the entity recommended to the user, update the parameter of the one or more of the target sub-classifier and the primary classifier based on negative feedback.

15. The device according to claim 11, further comprising:
an updating unit, configured to: after the second classification unit has performed the classification prediction on the feature data based on the target sub-classifier to obtain the second prediction data, update the center point of the target sub-classifier based on the data vector of the feature data.

16. The device according to claim 15, wherein the updating unit is configured to update the center point of the target sub-classifier based on an equation:

$$P_{t+1} = P_t + \frac{x_t - P_t}{n_i}, n_{i+1} = n_i + 1,$$

wherein $P_{t+1}$ indicates the center point of the target sub-classifier after the updating;
$P_t$ indicates the center point of the target sub-classifier before the updating; $x_t$ indicates the data vector; $n_i$ indicates an amount of data allocated to the target sub-classifier before the updating;
and $n_{i+1}$ indicates an amount of data of the target sub-classifier after the updating.

17. A computer readable storage medium storing a computer program, which when executed by a processor, configures the processor to implement acts including:
identifying a multi-classifier including a first classifier and a plurality of second classifiers;
performing a first classification prediction on a feature data corresponding to an entity based on the first classifier of the multi-classifier to obtain a first prediction score, the feature data including one or more of a characteristic, a property, or a parameter of the entity;
selecting a target second classifier from the plurality of second classifiers of the multi-classifier by comparing the feature data with a data distribution of each of the plurality of second classifiers, a similarity between a data distribution of the target second classifier and the feature data being highest among the plurality of second classifiers, a data distribution of a second classifier of the plurality of second classifiers being one or more of a distribution of data received and classified by the second classifier or a distribution of sample data used to train the second classifier, and having one or more of a center point or a Gaussian mixture model parameter;
performing a second classification prediction on the feature data based on the target second classifier of the multi-classifier to obtain a second prediction score;
combining the first prediction score and the second prediction score to obtain a third prediction score; and
recommending the entity to a user based on the third prediction score.

18. The computer readable storage medium of claim 17, wherein the acts further comprise:
after the recommending the entity to the user, detecting a response of the user to the recommending the entity; and
updating a parameter of one or more of the target second classifier or the first classifier based on the response of the user.

19. An electronic device, the electronic device comprising one or more processor and a memory storing one or more programs, which when executed by the one or more processors, configures the one or more processors to perform acts including:
forming a feature data including a first feature of an entity and a second feature of a user, the first feature including one or more of a characteristic, a property, or a parameter of the entity the second feature including one or more of a characteristic, a property, or a praramater of the user;

classifying the feature data using a first classifier to obtain a first prediction data;

selecting a second classifier among a plurality of classifiers that are different from the first classifier by comparing the feature data with a data; distribution of each of the plurality of classifiers, a similarity between a data distribution of the selected second classifier and the feature data being highest among the plurality of classifiers, a data distribution of a classifier of the plurality of classifiers being one or more of a distribution of data received and classified by the classifier or a distribution of sample data used to train the classifier, and having one or more of a center point or a Gaussian mixture model parameter;

classifying the feature data using the second classifier to obtain a second prediction data;

combining the first prediction data and the second prediction data to obtain a third prediction data; and determining a match between the entity and the user based on the third prediction data.

20. The electronic device of claim 19, wherein the selecting the second classifier includes:

in response to determining that each of the plurality of classifiers has a center point of data distribution, selecting a classifier whose center point is closest to a data vector of the feature data among the plurality of classifiers as a second classifier; and in response to determine that each of the plurality of classifiers has a Gaussian mixture model parameter in data distribution, selecting a classifier whose Gaussian mixture model parameter has a highest similarity with that of the feature data among the plurality of classifiers as a second classifier.

* * * * *

UNITED STATES PATENT AND TRADEMARK OFFICE
CERTIFICATE OF CORRECTION

PATENT NO. : 11,269,966 B2
APPLICATION NO. : 16/918869
DATED : March 8, 2022
INVENTOR(S) : Xinxing Yang et al.

It is certified that error appears in the above-identified patent and that said Letters Patent is hereby corrected as shown below:

In the Claims

Column 15, Claim 10, Line 9:
"characteristics," should read: --characteristic,--

Column 15, Claim 10, Line 14:
"slab-classifiers," should read: --sub-classifiers,--

Column 17, Claim 19, Line 8:
"a data; distribution" should read: --a data distribution--

Signed and Sealed this
Seventeenth Day of October, 2023

Katherine Kelly Vidal
*Director of the United States Patent and Trademark Office*